United States Patent
Bell (10) Patent No.: US 6,668,328 B1
(45) Date of Patent: Dec. 23, 2003

(54) COMPUTER SYSTEM HAVING A POWER SUPPLY FOR COUPLING SIGNALS TO A POWER LINE NETWORK AND TRANSMITTING INFRARED SIGNAL TO AT LEAST ONE PERIPHERAL CARD

(75) Inventor: Russell W. Bell, Freehold, NJ (US)

(73) Assignee: Globespanvirata, Inc., Red Bank, NJ (US)

(*) Notice: Subject to any disclaimer, the term of this patent is extended or adjusted under 35 U.S.C. 154(b) by 0 days.

(21) Appl. No.: 09/574,945

(22) Filed: May 19, 2000

Related U.S. Application Data (60) Provisional application No. 60/134,962, filed on May 19, 1999.

(51) Int. Cl.[7] .......................... G06F 1/26; G06F 15/16; H04M 11/04
(52) U.S. Cl. .................. 713/300; 713/310; 709/249; 709/250; 340/310.01
(58) Field of Search ................ 713/310, 300; 340/310.01, 310.02; 710/100; 709/249, 250

(56) References Cited

U.S. PATENT DOCUMENTS

| | | | | |
|---|---|---|---|---|
| 5,148,144 A | * | 9/1992 | Sutterlin et al. | 340/310.01 |
| 5,835,005 A | * | 11/1998 | Furukawa et al. | 340/310.01 |
| 5,870,016 A | * | 2/1999 | Shrestha | 340/310.02 |
| 5,895,342 A | * | 4/1999 | Solland | 482/96 |
| 5,994,998 A | * | 11/1999 | Fisher et al. | 340/310.01 |
| 5,999,798 A | * | 12/1999 | Yang | 455/66 |
| 6,014,386 A | | 1/2000 | Abraham | 370/485 |
| 6,057,812 A | * | 5/2000 | Arai et al. | 345/10 |
| 6,140,911 A | * | 10/2000 | Fisher et al. | 340/310.01 |
| 6,329,906 B1 | * | 12/2001 | Fisher et al. | 340/310.01 |
| 6,496,105 B2 | * | 12/2002 | Fisher et al. | 340/310.01 |

FOREIGN PATENT DOCUMENTS

| | | | |
|---|---|---|---|
| JP | 401297925 A | * | 12/1989 |
| JP | 405022773 A | * | 1/1993 |
| WO | 98/57440 | * | 12/1998 |

* cited by examiner

Primary Examiner—Thomas Lee
Assistant Examiner—Chun Cao
(74) Attorney, Agent, or Firm—Thomas, Kayden, Horstemeyer & Risley (57) ABSTRACT

The present invention is directed to a computer system having novel circuitry for coupling peripheral cards to a power line network. In this regard, the computer includes a switching power supply having coupling circuitry for coupling an electrical signal with a power line, a filter circuit electrically connected to the coupling means for receiving an electrical signal from the coupling means and filtering the received signal, and an amplifier circuit electrically connected to the filter circuit for amplifying the filtered signal. The computer system also includes at least one peripheral circuit (e.g., PC card). An infrared transmitter is coupled to the amplifier circuit for transmitting an infrared signal. Finally, the computer includes an infrared receiver coupled to the peripheral circuit for receiving the scattered infrared signal. In accordance with another embodiment of the invention, a power line adapter is provided for communicating signals between a power line and a computer. In accordance with yet another aspect of the invention, a method is provided for coupling a power line with a peripheral card in computer system. The method operates by coupling an electrical signal, within a switching power supply, with the power line, transmitting the electrical signal through an infrared transmitter disposed at the on the switching power supply, diffusing the signal transmitted from the infrared transmitter, and receiving the diffused signal through an infrared receiver disposed on a peripheral card.

7 Claims, 4 Drawing Sheets

COMPUTER SYSTEM HAVING A POWER SUPPLY FOR COUPLING SIGNALS TO A POWER LINE NETWORK AND TRANSMITTING INFRARED SIGNAL TO AT LEAST ONE PERIPHERAL CARD

CROSS-REFERENCE TO RELATED APPLICATION

The present application claims the benefit of U.S. provisional patent application, Ser. No. 60/134,962, filed May 19, 1999, which is hereby incorporated by reference in its entirety.

BACKGROUND OF THE INVENTION

1. Field of the Invention

The present invention generally relates to computer networks, and more particularly, to a system and method for coupling signals to a power line network.

2. Discussion of the Related Art

LANs are computer networks operating over a small area such as a single department in a company. Most LANs serve to transport data between personal computers and workstations and file servers. In general, the devices on a LAN must follow certain rules of operation to communicate effectively. These rules of operation are known as protocols. A variety of different LAN protocols are available. For example, the IEEE 802.3 standard deals with a network architecture and protocol termed Ethernet. Stations in an Ethernet network may be connected through interfaces to a coaxial cable, twisted pair wire or fiber optics. A major disadvantage associated with Ethernet technology is the cost of routing a transmission medium between each proposed station on the LAN.

The dramatic growth of Internet applications has created the need for small office, home office, and remote locations with multiple personal computers (PCs) to share high speed interfaces with the Internet. In addition, business and home office configurations have a need to share files and peripheral devices, such as printers, among several PCs. A variety of techniques to interconnect various closely located PCs, peripherals, and "Internet compatible appliances" have been proposed including: radio-frequency (RF), infrared, existing phone lines, power lines, and traditional cabling methods. Each of the alternative infrastructure configurations has advantages and disadvantages for the end user.

Radio-Frequency

RF transceivers may provide a wireless mechanism to interconnect various PCs and related peripherals inside a home or office. BLUETOOTH™—is an example of a low-power RF implementation. RF transceiver infrastructures eliminate most of the cabling from the LAN and provide limited location independence for their users. In order to effectively transfer data, the data transmissions must be broadcast with sufficient power to enable reception and accurate demodulation of the intended data signal at the receiving device. As a result, RF systems are subject to "eavesdroppers" that might intercept the radiated data signals. Furthermore, RF LAN infrastructure systems may require Federal Communications Commission (FCC) licenses to operate equipment at certain frequencies, adding to the installation and operating expense of the system. RF systems designed to operate in unlicensed frequency bands assume a potential risk of interference from other users. In order to achieve practical data rates and reasonable antenna sizes using RF technology without the added expense of procuring broadcast licenses, typical implementations operate between 2 to 3 GHz in the unlicensed band of frequencies. This frequency range suffers from significant degradation due to path loss in environments with significant water vapor. In short, RF LAN infrastructures suffer from low security and the risk of RF interference from operators of like equipment. In addition, RF LAN implementations may suffer from interference from microwave ovens and significant signal power loss in damp environments.

Radio-Frequency—BLUETOOTH™

BLUETOOTH™ is a low-power RF technology designed to operate in the 2.4 GHz ISM band. BLUETOOTH™ is designed to operate over a distance of 10 meters with the goal of interfacing various local devices without cables. Ideally, BLUETOOTH™ compatible devices could connect via the low-power RF link to enable a laptop computer to access an Email account via a cellular phone. The link is established without traditional cabling between the cellular phone and the laptop computer, assuming both devices are equipped with the BLUETOOTH™ RF technology and are within transmission range of each other. BLUETOOTH™ suffers from security issues like other RF technologies. Security issues are not as severe for BLUETOOTH™ due to its lower transmitted power. On the other hand, lower transmitted power results in a shorter effective range of operation.

Infrared Communications

Infrared (IR) communications were popularized by the television remote control and have since penetrated a host of other home electronic device, personal data assistant (PDA), and laptop computer markets. Current technology uses IR light emitting diodes (LEDs) to emit sufficient optical energy to communicate data between devices within line of sight of one another. As such, IR communications are limited to a particular room as the frequencies do not penetrate solid objects. Data rates as high as 16 Mbps are expected to soon be a reality as IR communications standardization groups drive the technology.

Telephone Lines

Telephone lines are a common fixture in most every US home. In addition, most PCs are equipped with telephone modem technology and are usually connected to a telephone line servicing the home via a jack and a patch cord. Modem manufacturers have interconnected PCs through the use of various modulation schemes at high frequencies to avoid interference from POTS and standard data modem communications. A home networking consortium technology (Home PNA) was formed to advance phone line networking. The consortium has developed a series of standards defining protocols. However, unterminated stubs, crosstalk, poor frequency response, noise, ingress, and egress are issues that have hindered a successful market deployment of phone line based LAN technology. Another shortcoming of the technology is the throughput capability of the system. The current Home PNA standard supports a throughput of 1 Mbps. Contrast the expected transfer rate of 16 Mbps for wireless IR connected systems. In addition to the aforementioned shortcomings of phone line based LAN technology, this technology may have difficulty traversing from home networks into the typical office environment as a significant number of offices are wired in a star topology to support private branch exchange (PBX) telephone systems.

Power Line Networks

Power Line networks are networks established across power lines, such as wiring within the structure of a home or small office. In such networks, data signals are carried (e.g. modulated) over the 60 Hz power signals that are carried on those lines. As is known, certain difficulties and issues exist in these systems. First, a power line is an inherently noisy medium for data transmission, particularly high frequency data transmissions. Another issue that arises in implementing power line networks relates to data security and loss of transmission bandwidth with others on the same side of the power line transformer. One example of a system and method for communicating data over power line, or in-wall, wiring is disclosed in U.S. Pat. No. 6,014,386, which is incorporated herein by reference.

There are various problems or difficulties in implementing power line networks. One problem or shortcoming that is present in prior art systems is the direct coupling of circuit components to the power line. When processing or component circuitry is directly coupled to power lines, then power surges, spikes, and other transients that occur on power lines are directly coupled to the processing or component circuitry. This leads to premature component failure and destruction. This shortcoming is avoided in systems that use "wall warts" to provide the gateway to the power line network. However, such systems generally have an unnecessary duplication of many circuit components. For example, the wall warts include transformers, filters, transient suppression circuitry, and other circuit components that are often present in the switching power supply of computer.

Accordingly, there is a desire for a system and method for providing power line networking that overcomes the problems and shortcomings of the prior art systems.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the objects and advantages of the present invention, the present invention is directed to a computer system having novel circuitry for coupling peripheral cards to a power line network. In this regard, the computer includes a switching power supply having coupling circuitry for coupling an electrical signal with a power line, a filter circuit electrically connected to the coupling means for receiving an electrical signal from the coupling means and filtering the received signal, and an amplifier circuit electrically connected to the filter circuit for amplifying the filtered signal. The computer system also includes at least one peripheral circuit (e.g., PC card). An infrared transmitter is coupled to the amplifier circuit for transmitting an infrared signal. The computer also preferably includes a diffuser disposed to receive the infrared signal output from the infrared transmitter. The diffuser is operative to scatter the infrared signal in multiple directions so that it may be readily received by various infrared receivers disposed in various locations. Finally, the computer includes an infrared receiver coupled to the peripheral circuit for receiving the scattered infrared signal.

In accordance with another embodiment of the invention, a power line adapter is provided for communicating signals between a power line and a computer. The power line adapter includes a first connector for connection with a power line and a second connector for connection with a computer. The adapter further includes coupling circuitry for coupling an electrical signal with the power line. The adapter further includes means for communicating the electrical signal coupled with the power line to and from a remote location.

In accordance with another aspect of the invention, a method is provided for coupling a power line with a peripheral card in computer system. The method operates by coupling an electrical signal, within a switching power supply, with the power line, transmitting the electrical signal through an infrared transmitter disposed at the on the switching power supply, diffusing the signal transmitted from the infrared transmitter, and receiving the diffused signal through an infrared receiver disposed on a peripheral card.

BRIEF DESCRIPTION OF THE DRAWINGS

The drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized various aspects of the present invention, reference will now be made in detail to the description of the invention as illustrated in the drawings. While the invention will be described in connection with these drawings, there is no intent to limit it to the embodiment or embodiments disclosed herein. On the contrary, the intent is to cover all alternatives, modifications and equivalents included within the spirit and scope of the invention as defined by the appended claims.

Local area networks (LANs) have reduced the effective cost of distributing DSL services. In this regard, many small businesses (and even homes with multiple computers) implement LANs over which multiple computers can communicate. In a LAN environment, a single DSL service/connection may be purchased and configured to allow all computers on the LAN access to the DSL service, thereby reducing the cost associated with providing DSL services to each computer on the LAN.

Figure 1:
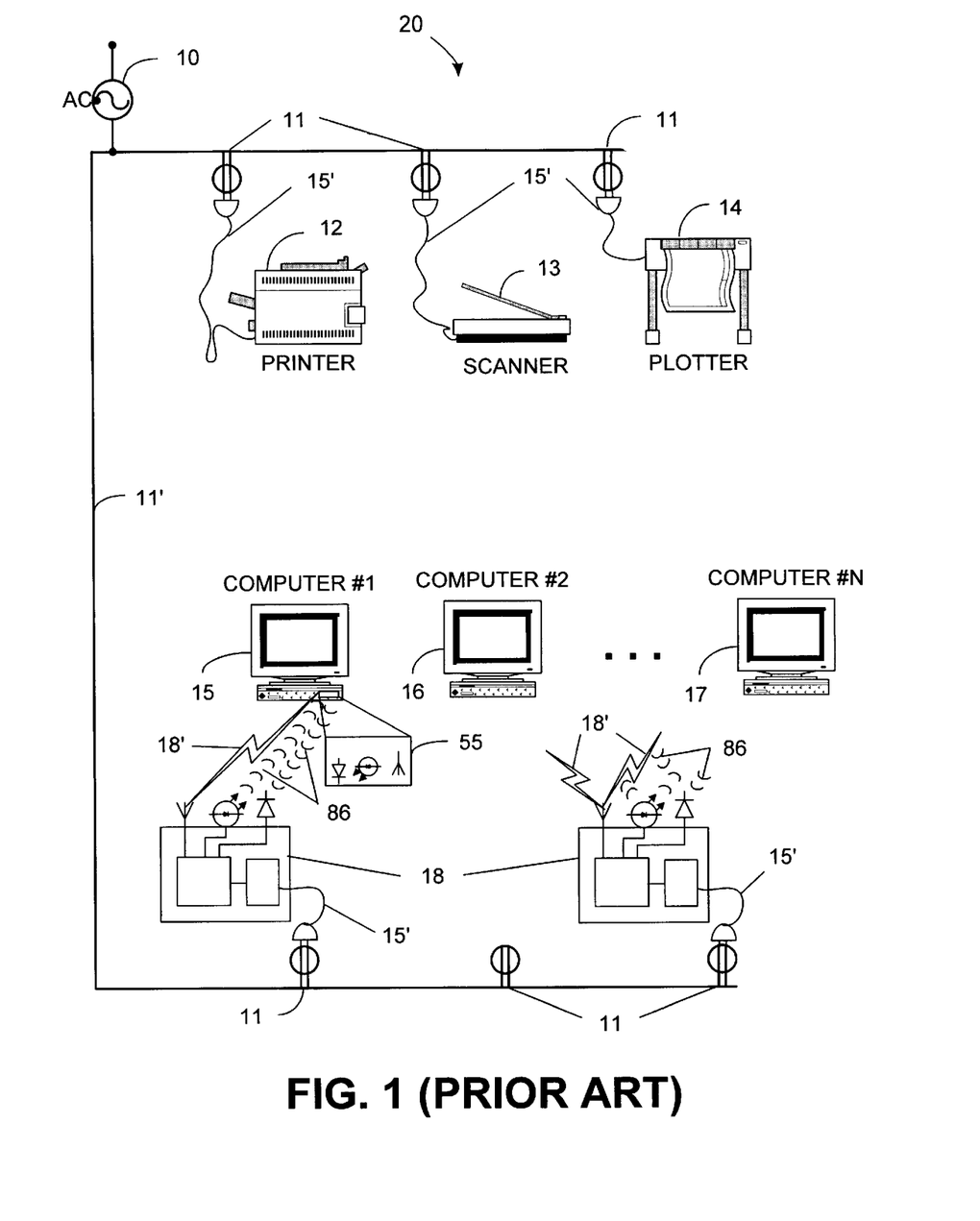
FIG. 1 is a diagram illustrating a LAN system, networked over a power-line.

To illustrate a power-line network as is known in the prior art, reference is now made to FIG. 1. The network 20 illustrated in FIG. I depicts a variety of devices interconnected through a power line 11'. By way of reference, these devices include a printer 12, a scanner 13, a plotter 14, and a plurality of computers 15, 16, and 17. The printer 12, scanner 13, and plotter 14 are directly connected to the power line 11' through their respective power cords 15'. In contrast, the computers 15, 16, and 17 are connected to the power line 11' through and wireless links.

More particularly, the wireless links are established through the use of LAN interface devices 18. These LAN interface devices 18 are also referred to as "wall warts." The operation and internal structure of such LAN interface devices 18 will be understood by persons skilled in the art and, therefore, need not be described herein. Suffice it to say that these LAN interface devices 18 include internal circuitry, such as transformers and other devices, that serve to couple electrical signals with the power line 11'. The LAN interface devices 18 also include circuitry capable of transmitting and receiving wireless communications. Such circuitry typically includes transceivers, such as RF transceivers, infrared transceivers, ultrasonic transceivers, etc. Corresponding circuitry 55 is also provided in each of the computers 15, 16, and 17 to enable the computers to communicate with the respective LAN interface device 18.

As illustrated in FIG. 1, a single LAN interface device 18 may communicate with a single computer 15. Alternatively, a single LAN interface device 18 may communicate with multiple computers, such as computers 16 and 17 as illustrated.

In operation, a device, such as the printer 12, may simply be plugged into a wall outlet 11 and turned on. Appropriate circuitry (such as a network card) provided within the device 12 operates to both detect the presence of a LAN, as well as to inform the LAN and other devices connected to the LAN that the device 12 is now present on the network. Likewise, internal circuitry (not shown) within other devices, such as the scanner 13 and plotter 14, operates in a similar fashion. Similarly, when computer 15 is powered up, internal circuitry 55 transmits appropriate signaling to determine whether a LAN 20 is present. Assuming that computer 15 is within the transmission distance of the LAN interface device 18, then the computer 15 will receive reply transmissions from the LAN interface device 18. Through signaling methodologies that are known in the art, the computer 15 and LAN interface device 18 will synchronize in such a manner that the computer 15 has a "presence" on the LAN 20. Alternatively, when the computer 15 is initially powered up, its internal circuitry 55 may simply "listen" for network transmissions. Upon receiving appropriate signaling from the LAN interface device 18, then the computer 15 may respond with appropriate signaling that allows the computer 15 to synchronize with the LAN.

As will be appreciated by persons skilled in the art, each of the devices 12, 13, 14, 15, 16, and 17 (and any other devices on the LAN 20) will include appropriate circuitry is for coupling electrical signals to the power line 11'. This circuitry will typically include one or more transformers, filtering circuitry, amplifiers, transient suppression circuits, etc. It has been recognized by the inventor of the present invention that portions of this circuitry are duplicative. For example, the transformer, filtering, amplifier, transient suppression, etc. circuitry that is present in the LAN interface devices 18 is also present (in one form or another) in the switching power supplies of each of the computers 15, 16, and 17.

Figure 2:
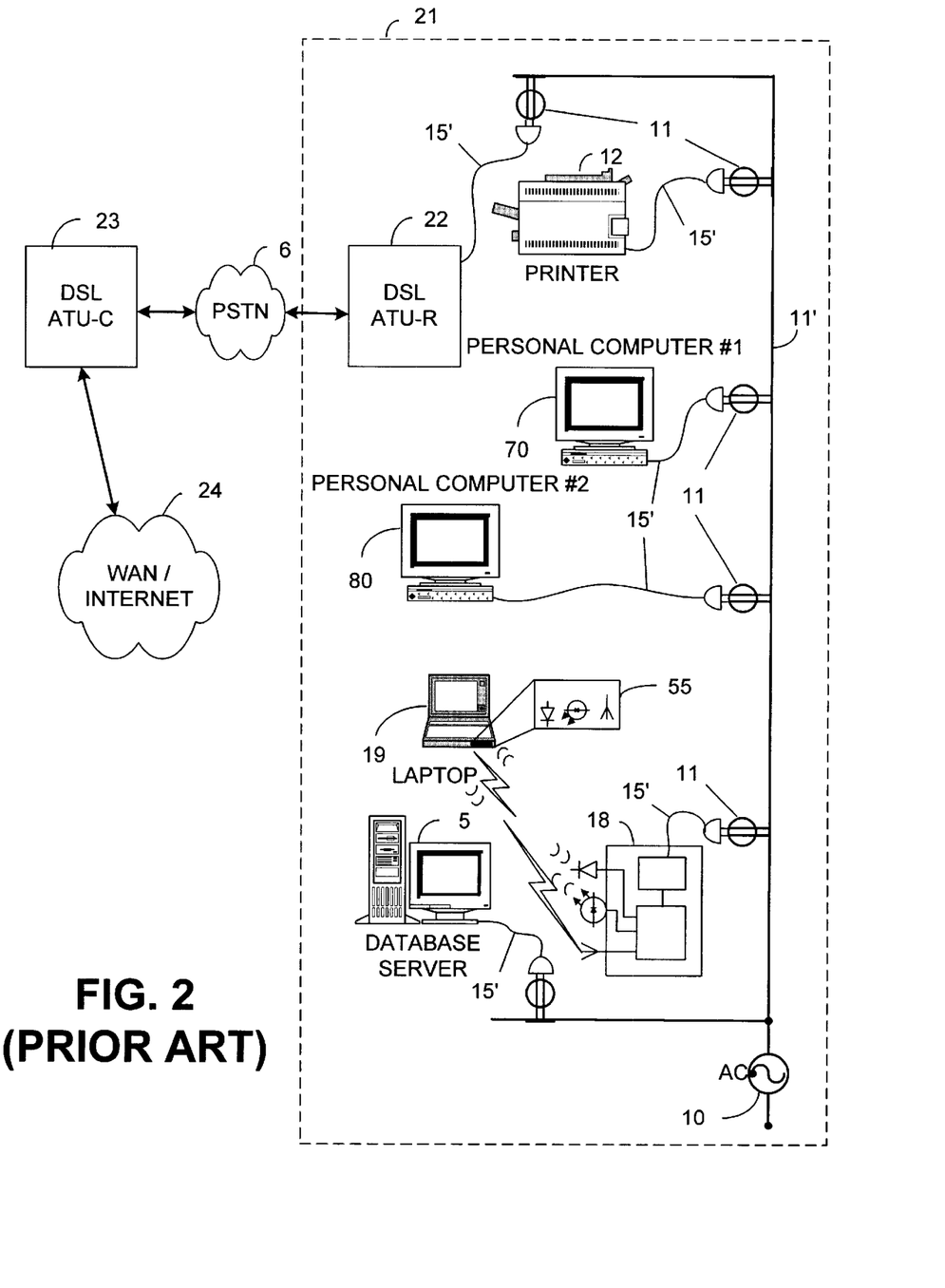
FIG. 2 is a block diagram illustrating connectivity of the LAN of FIG. 1 with a WAN via a DSL bridge.

Reference is now directed to FIG. 2, which illustrates the connectivity of the LAN 20 of FIG. 1 with a WAN via a DSL bridge and the PSTN as constructed in accordance with the present invention.

FIG. 2 shows a LAN 21 constructed in accordance with the LAN 20 previously illustrated in FIG. 1 with a LAN compatible DSL asynchronous transmission unit-remote (DSL ATU-R) 22. In this embodiment, the DSL ATU-R 22 provides the LAN 21 with connectivity to the PSTN 6. A similarly configured DSL asynchronous transmission unit-central office (DSL ATU-C) 23 is also in communication with the PSTN 6 and the WAN/Internet 24. In this way, a DSL bridge formed through the combination of the DSL ATU-R 22, the PSTN 6, and the DSL ATU-C 23 provides connectivity between the LAN 21 and the WAN/Internet 24.

In this regard, a central office (not shown) is configured to receive broadband services such as the WAN/Internet 24 which it assembles via a central office DSL for transmission over the PSTN to DSL service customers such as the operator of the LAN 21. The central office (not shown) assembles signals from the aforementioned broadband services for appropriate transformation and transmission by DSL ATU-C 23.

The LAN 21 has a compatible DSL ATU-R 22, which processes and distributes the several services to appropriate destination devices such as the computers 15', 16', and the laptop 19 as illustrated. It should be understood that the circuitry conventionally implemented in both the DSL ATU-C 23 and the DSL ATU-R 22 will be appreciate by persons skilled in the art, and need not be described herein.

The LAN 21 consists of a commercial alternating-current (AC) power supply 10 provided to the LAN 21 via power supply network wires 11' and power outlets 11. The aforementioned power supply network wires 11' and power outlets 11 are not only used to supply the necessary electrical power to the LAN 21 components, they also provide the necessary infrastructure to transfer network message traffic between devices on the LAN 21. The LAN 21 may further consist of the following devices configured with a network traffic compatible power supply: a printer 12, personal computers 70 and 80, as well as, a database server 5. As previously described in the description of the LAN 20 (see FIG. 1), connectivity to the LAN 21 for the previously mentioned devices is supplied via a line cord 15' and a network traffic compatible internal power supply integrated within each of the devices. The LAN 21 may further consist of one or more LAN interface device(s) 18 similarly connected to the LAN 21 via a line cord 15' and power supply network wires 11'. As described previously, the LAN interface device 18 may be configured to provide a wireless link to the laptop 19 via either or both RF transmissions 18' and IR transmissions 86'. In this regard, the wireless link is completed at the laptop 19 by a wireless interface device 55.

Figure 3:
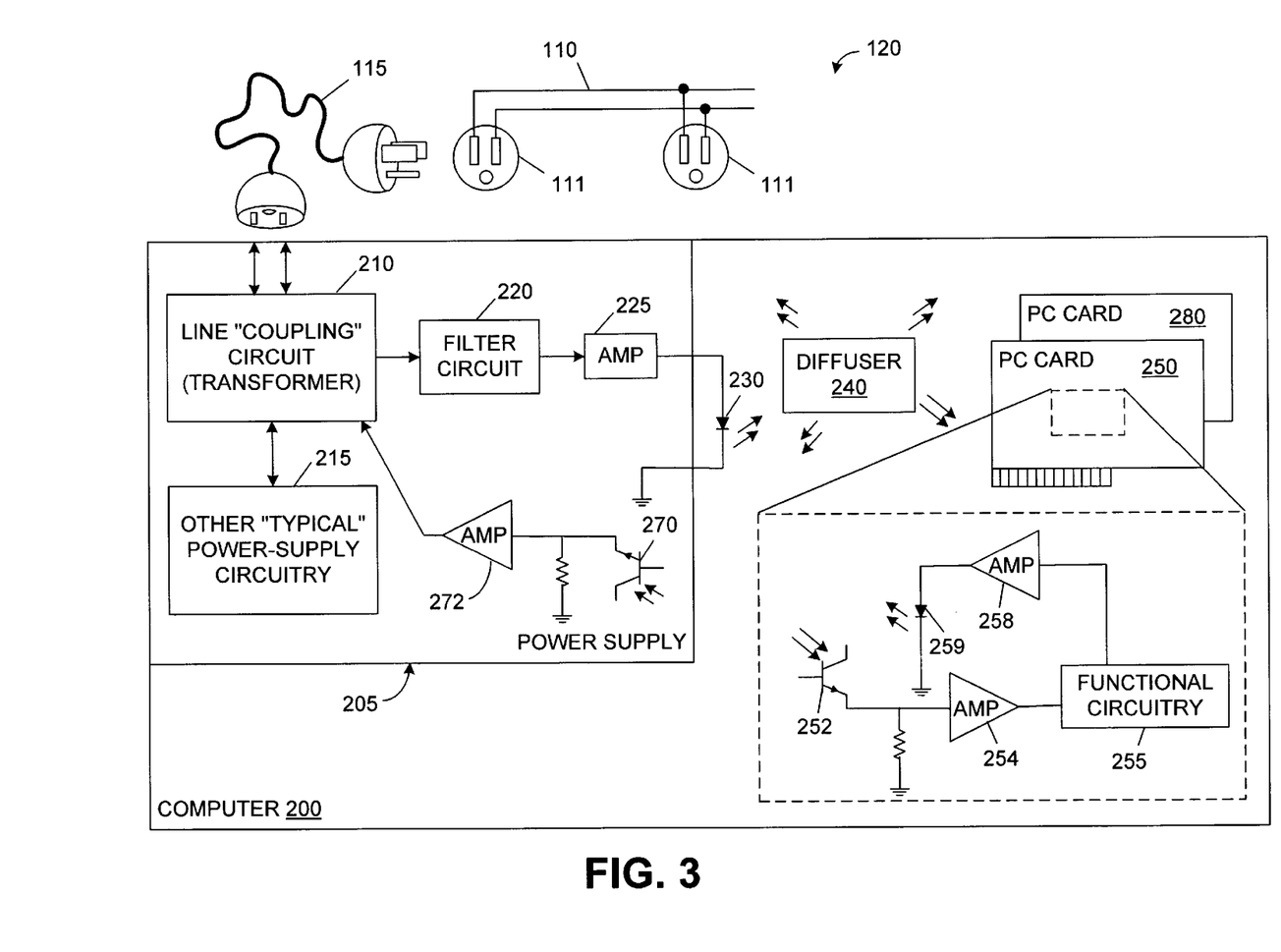
FIG. 3 is a block diagram of a computer coupling peripheral cards with a power line via infrared transceivers, in accordance with the present invention.

Reference is now made to FIG. 3, which illustrates a system constructed in accordance with the teachings of the present invention. Specifically, FIG. 3 illustrates a LAN 120 which communicates across a power line 110. Power line 110 is a standard power line that carries electricity throughout a structure, such as an office building or a home. The power line 110, as is known, is terminated in numerous locations by electrical outlets 111. A computer 200 or other device may be electrically connected to the power line 110 through power cords 115.

The computer 200 illustrated in FIG. 3 implements a novel circuit that allows peripheral cards 250 and 280 to intercommunicate with each other as well as to intercommunicate with other devices that may be located at other points along the power line network 120. In accordance with the invention, circuits may intercommunicate in an electrically decoupled fashion. Specifically, the preferred embodiment of the invention utilizes infrared transceivers to couple remote electrical circuits. This electrical "decoupling" is particularly important for communications between circuitry on a peripheral card 250 and the power line 110. As is illustrated, these communications occur, in part, through the circuitry of the switching power supply 205 of the computer 200. As is known, an electrical power line 110 is an inherently noisy environment. There are frequent voltage spikes and other transients that occur on the power line 110 that can damage sensitive electronic circuitry, if the circuitry is not adequately protected. By using a wireless medium (e.g., infrared), the power supply 205 is adequately decoupled from the circuitry on the peripheral cards 250 and 280 such that electrical spikes or transients present on the power line 110 can damage the circuitry on the peripheral cards 250 and 280.

To more particularly describe the circuitry within the computer 200, the computer 200 includes a power supply 205 that is uniquely adapted for wireless communication with peripheral cards 250 and 280. As is known, computers typically include a power supply and a plurality of peripheral cards that are configured to plug into a motherboard (not shown). As is further known, the motherboard typically includes a CPU, RAM, ROM, and other circuitry that is used in virtually every computer system. Peripheral cards are used to provide additional circuitry, and therefore functionality, to a computer. For example, a network adapter may be provided in the form of peripheral card to adapt a computer to communicate over a computer network, such as an Ethernet. Similarly, other peripheral cards may include circuitry such as a video card for generating a video signal for a video monitor.

In a typical computer, the power line 110 is substantially electrically isolated from the circuitry on the motherboard as well as the peripheral cards. Although the power supply within a computer supplies power to the components from both the motherboard and the peripheral cards, the power supply does not directly couple with inputs or outputs of circuit components. However, in a computer environment where computers are coupled to a power line network, then the inputs and outputs of certain circuit elements must be coupled to the power line 110. The computer system 200 of the present invention is uniquely adapted for such an environment.

Broadly, the power supply 205 includes circuitry that transmits 10 receives wireless signals to and from peripheral cards 250 and 280 and/or circuitry on the motherboard (not shown). In the preferred embodiment, the wireless medium is infrared transmissions. To more particularly describe the circuitry, the power supply 205 includes line decoupling circuitry to 10. This is a circuit that allows signals to be modulated upon and demodulated from the power line 110. Among other circuit devices, this line decoupling circuitry will typically include a transformer. A detailed recitation of the circuitry need not be provided herein, as engineers skill in the art will understand and appreciate how to design such circuitry, and the present invention is not intended to be limited by the particular implementation of the line coupling circuitry 210.

FIG. 3 also illustrates a block denoted as other "typical" power supply circuitry 215. This circuitry includes the circuitry that is normally provided within a power supply for generating the DC voltages is that are used to supply power to the various components in the computer system 200. As such, the circuitry in this box will be well known and appreciated by persons skilled in the art.

FIG. 3 also illustrates a filter circuit 220 and an amplifier 225. The filter circuit 220 will preferably be implemented as a low pass filter and is operative to filter out high frequency spikes or transients that may otherwise be picked up from the power line 110 by the line decoupling circuitry 210. The amplifier 225 may be an operational amplifier or other appropriate amplifying circuitry that operates to amplifier, if necessary, the signal output from the filter circuit 220. The signal output from the amplifier 225 is then input to an infrared transmitter (e.g., a photodiode) 230. In a manner known by those in the art, the infrared transmitter 230 operates to convert that electrical input signal to an infrared output signal. The signal is then communicated to the various peripheral cards 250 and 280 and/or motherboard.

In the preferred embodiment, a diffuser 240 is interposed between the infrared transmitter 230 and the peripheral cards 250 and 280 and/or the motherboard. Preferably, the diffuser 240 will be disposed near the infrared transmitter 230, and configured to "splatter" the infrared signal output from the infrared transmitter 230 to many points throughout the interior of the computer 200. This will allow infrared receivers disposed on the various peripheral cards 250, 280 and/or motherboard to receive the signal transmitted by infrared transmitter 230. Indeed, in this regard it may be deemed that more than one diffuser 240 is desirable, in a given computer, to carry out this function.

The diffuser 240 itself may take on a variety of forms. In one embodiment, it may simply be a piece of glass curved like a wide-angle lens. Consistent with the scope and spirit of the invention, however, the diffuser 240 may take on other forms that are consistent with its functional operation. As stated above, the functional operation of the diffuser 240 is to redirect the infrared signal transmitted by infrared transmitter 230 to many directions throughout the interior of the computer 200.

As previously mentioned, the computer 200 includes a variety of peripheral cards 250, 280. Each peripheral cards 250, 280 includes the functional electronic circuitry for carrying out the basic function of the peripheral card. In addition, however, each peripheral card 250, 280 includes an infrared receiver 252 (such as a phototransistor) for receiving the infrared signal transmitted by the infrared transmitter 230. In most embodiments, an amplifier circuit 254 for will also be provided on the peripheral cards 250, 280 to amplify the signal output from the infrared receiver 252.

Through the circuitry described above, signals carried on the power line 110 may be removed through the line decoupling circuitry 210, filter, amplified, transmitted and received via infrared, and delivered to the functional circuitry 255 of the peripheral cards 250, 280. In a similar fashion, signals generated by the functional circuitry 255 of the peripheral cards 250, 280 may be communicated to the power line 110. To achieve this functionality, an amplifier 258 may be provided to drive an infrared transmitter 259 (e.g., a photodiode). The infrared transmitter 259 transmits infrared signals to a infrared receiver 270 (e.g., a phototransistor) which may drive an amplifier 272 and deliver the resulting electrical signal to the line decoupling circuitry 210. This circuitry may then couple (i.e., modulate) the resulting electrical signal onto the power line 110. One or more additional diffusers (not shown), like diffuser 240, may be provided to assist in the communication of the signal from the infrared transmitter 259 to the infrared receiver 270.

In an alternative embodiment (not shown), the diffuser 240 may not be necessary. For example, the infrared transmitter 230 may be coupled to an infrared receiver disposed in a predetermined location either on a peripheral card or the motherboard, such that the infrared transmitter 230 in the infrared receiver are disposed in direct light of sight. The output of the infrared receiver may then be coupled to a bus or other medium for communication of the received signal throughout the motherboard and other various peripheral cards. Such an embodiment provides adequate electrical isolation between the power supply 205 and the functional circuitry of the motherboard and peripheral cards, while maintaining a communication link therebetween. In such an embodiment, there would be a similar line of sight communication path from the motherboard or peripheral card to the power supply.

It should be understood that what has been illustrated in FIG. 3 and described above is the basic circuitry for coupling a power line 110 with functional circuitry in a computer 200. It should be appreciated that this basic circuitry may be expanded to provide more robust functions. For example when computer 200 is plugged into a wall outlet 111 it is immediately coupled to the network 120. At such time it becomes "visible" to the other devices on the network 120. In a manner that is known, certain circuit components within computer 200 may be designated a "shared" such that they are visible to the network 120. Alternatively, certain circuit components of computer 200 may be restricted from network access.

The various peripheral cards 250, 280 may be configured to intercommunicate directly through electrical coupling via the motherboard or, alternatively, may communicate via infrared transmissions. In a more elaborate embodiment, the circuitry illustrated FIG. 3 may be configured to allow purely "local" communications among the peripheral cards 250, 280. In that respect, a network bridge may be provided at the power supply and operate to prevent purely "local" communications from being transmitted through the power supply to the power line 110.

In one implementation, additional circuitry may be provided to regulate the infrared communications. It may be desired to regulate these communications to behave much like an Ethernet. In such environment, each device would "listen" to determine whether any other device was "talking" before beginning and infrared transmissions. Such an approach would generally prevent different devices from "talking" over each other. These and other well-known networking concepts may be implemented in addition to the basic circuitry illustrated in FIG. 3, consistent with the scope and spirit of the present invention.

It should be appreciated that much of the circuitry contained within the power supply 205 are components that already exist within power supplies. Therefore, the present invention can be implemented at a relatively modest cost.

Figure 4:
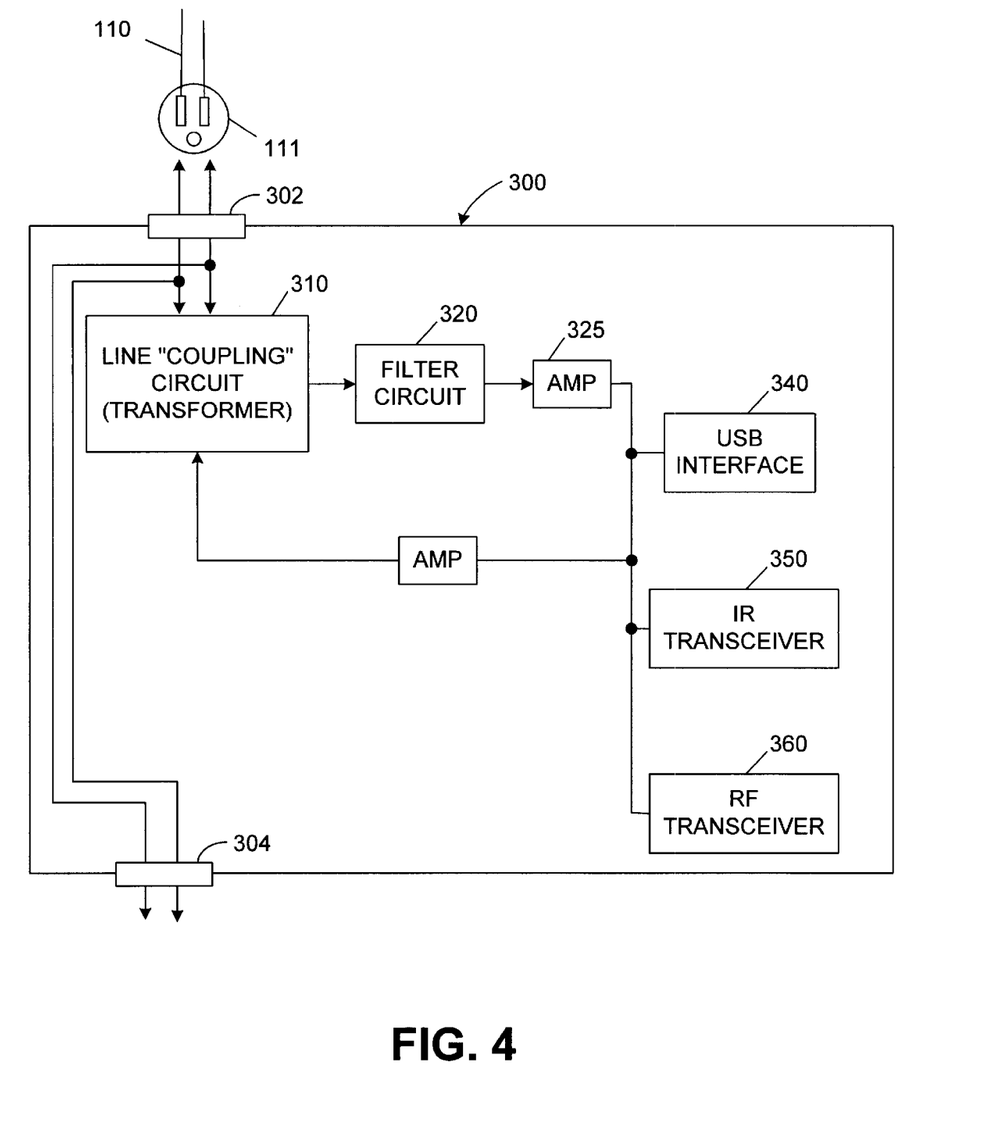
FIG. 4 is a block diagram of an adapter module for retrofitting a computer to couple the peripheral cards with a power line, in a manner that isolates the electrical components of the peripheral cards from the power line.

It should be appreciated that it may be desired to equip conventional computers (i.e., those not containing the circuitry illustrated in FIG. 3) to readily adapt to a power line network. A relatively simple circuit may be provided to achieve this goal. Indeed, such a circuit is illustrated in FIG. 4. The circuit of FIG. 4 is intended to be disposed in line with a power cord, and interposed between a wall out of 111 and a computer. In this regard, an adapter 300 may include a plug 302 for receiving one end of the power cord 315, which power cord may be plugged in to a wall outlet 111 at the other end. Likewise, the adapter 300 may also include an outlet 304 that may be connected to a computer via a second power cord. The adapter 300, internally, may include a line decoupling circuit 310, which may be similar in structure and operation to the line decoupling circuitry 210 described in connection with FIG. 3. Likewise, the adapter 300 may include a filter circuit 320 and amplifier circuit 325 that are similar to the filter circuit 220 and amplifier circuit 225 of FIG. 3.

In addition, however, the adapter 300 may include a mechanism for communicating a signal to the computer in a way that isolates the signal from the power line 110. This "mechanism" may be provided in various forms, consistent with the invention. In one form, this "mechanism" may include a USB interface 340. Although not shown, an appropriate physical connector may be provided to directly connect a USB interface 340 with the computer. In this way, signals demodulated by the line coupling circuit 310 from the power line 110 may be communicated via a USB bus to the computer.

An alternative mechanism may include an infrared transceiver 350. Although not shown, an appropriate mechanism will necessarily need to be provided to communicate the infrared signals from the adapter 300 to the computer. Likewise, an appropriate circuit must be provided at the computer to receive and disseminate the infrared signal. Yet another mechanism for communicating a signal obtained from the power line 110 to the computer could include an RF transceiver 360 again, like the infrared transceiver 350, an appropriate mechanism (i.e., a companion RF transceiver) must be provided at the computer for receiving RF communications transmitted from the RF transceiver 360.

It should be appreciated that there are a variety of ways and mechanisms that may be implemented for carrying out to the communications between the adapter 300 and the computer. For purposes of the present invention, what is significant is the broad concepts of providing a circuit interposed between a wall outlet 111 and a computer that allows signals to be modulated and demodulated on a power line 110, and that communicates those signals to a computer for carrying out power line networking.

In this regard, the embodiment or embodiments discussed herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A computer system comprising:
   a switching power supply having coupling circuitry for coupling an electrical signal with a power line, a filter circuit electrically connected to the coupling means for receiving an electrical signal from the coupling means and filtering the received signal, and an amplifier circuit electrically connected to the filter circuit for amplifying the filtered signal;
   at least one peripheral circuit;
   an infrared transmitter coupled to the amplifier circuit for transmitting the amplified signal;
   a diffuser disposed to receive the infrared signal output from the infrared transmitter, the diffuser operative to scatter the infrared signal in multiple directions; and
   an infrared receiver coupled to the peripheral circuit for receiving the scattered infrared signal.

2. The computer system as defined in claim 1, further including a second infrared transmitter coupled to the at least one peripheral circuit for transmitting an infrared signal.

3. The computer system as defined in claim 2, further including a second infrared receiver coupled to the switching power supply for receiving infrared signals transmitted from the second infrared transmitter.

4. The computer system as defined in claim 1, wherein the at least one peripheral circuit includes a plug-in type circuit card.

5. The computer system as defined in claim 1, wherein the diffuser includes a piece of glass curved at a wide angle.

6. The computer system as defined in claim 1, further including a plurality of plug-in type circuit cards, each having an infrared receiver and an infrared transmitter.

7. The computer system as defined in claim 6, wherein each of the plurality of circuit cards is configured to evaluate the signal at its infrared receiver to ensure that no other infrared communications are taking place before sending an electrical signal to its infrared transmitter.

* * * * *